United States Patent
Keenan et al.

(10) Patent No.: US 9,068,269 B2
(45) Date of Patent: Jun. 30, 2015

(54) INHIBITING CORROSION CAUSED BY AQUEOUS ALDEHYDE SOLUTIONS

(75) Inventors: Stephen R. Keenan, Southport (GB); Jonathan Collins, Liverpool (GB); Sunder Ramachandran, Sugarland, TX (US); Vladimir Jovancicevic, Richmond, TX (US); Rose Tompkins, Katy, TX (US); Grahame N. Taylor, Tomball, TX (US); Richard L. Martin, Pinehurst, TX (US); Michael L. Walker, Sugar Land, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 396 days.

(21) Appl. No.: 13/589,794

(22) Filed: Aug. 20, 2012

(65) Prior Publication Data

US 2013/0224092 A1    Aug. 29, 2013

Related U.S. Application Data

(63) Continuation-in-part of application No. 13/540,383, filed on Jul. 2, 2012, now abandoned, which is a continuation-in-part of application No. 13/253,706, filed on Oct. 5, 2011, now abandoned.

(51) Int. Cl.
| | | |
|---|---|---|
| C09K 8/54 | (2006.01) |
| C23F 11/167 | (2006.01) |
| C10G 29/00 | (2006.01) |
| C10G 29/24 | (2006.01) |
| C23F 11/18 | (2006.01) |
| C23F 11/16 | (2006.01) |
| C09K 8/532 | (2006.01) |

(52) U.S. Cl.
CPC ............ *C23F 11/1673* (2013.01); *C10G 29/00* (2013.01); *C10G 29/24* (2013.01); *C23F 11/188* (2013.01); *C23F 11/162* (2013.01); *C23F 11/184* (2013.01); *C09K 8/532* (2013.01); *C09K 8/54* (2013.01)

(58) Field of Classification Search
None
See application file for complete search history.

(56) References Cited

U.S. PATENT DOCUMENTS

| | | |
|---|---|---|
| 2,891,909 A | 6/1959 | Hughes |
| 3,081,146 A | 3/1963 | Boies et al. |
| 3,637,341 A | 1/1972 | Horton et al. |
| 4,233,088 A | 11/1980 | Kronstein |
| 4,554,090 A | 11/1985 | Jones |
| 5,091,113 A | 2/1992 | Clubley |
| 5,386,038 A | 1/1995 | Davis et al. |
| 5,508,012 A | 4/1996 | Trauffer |
| 5,556,832 A | 9/1996 | Van Slyke |
| 2006/0194700 A1 | 8/2006 | Gatlin et al. |
| 2006/0264335 A1 | 11/2006 | Penna et al. |
| 2012/0241361 A1 | 9/2012 | Ramachandran et al. |
| 2013/0089460 A1 | 4/2013 | Keenan et al. |
| 2013/0090271 A1 | 4/2013 | Keenan et al. |

OTHER PUBLICATIONS

Melendres, C.A., et al., "Laser Raman Spectrochemical Studies of Anodic Corrosion and Film Formation on Iron in Phosphate Solutions," Electrochimica Acta, 34, 281-286 (1989).
Etteyeb, N., et al., "Corrosion Inhibition of carbon steel in alkaline chloride media by Na3P04," Electrochimica Acta, 52, 7506-7512 (2007).

*Primary Examiner* — John J Figueroa
(74) *Attorney, Agent, or Firm* — Mossman Kumar & Tyler PC

(57) ABSTRACT

Aldehydes useful as $H_2S$ sulfide scavengers may be corrosive to some metals such as steel, iron and aluminum, but the corrosive effect of the aldehydes may be mitigated by employing a corrosion inhibitor selected from the group consisting of a di-basic soluble phosphate salt, a tri-basic soluble phosphate salt, a phosphate ester, a thiophosphate ester, a thioamine, a Mannich Reaction Product, and combinations thereof.

19 Claims, No Drawings

INHIBITING CORROSION CAUSED BY AQUEOUS ALDEHYDE SOLUTIONS

CROSS-REFERENCE TO RELATED APPLICATIONS

This application is a $2^{nd}$ continuation-in-part of U.S. patent application Ser. No. 13/540,383 filed on Jul. 2, 2012, the disclosure of which is incorporated herein by reference in its entirety; and its parent application Ser. No. 13/253,706, filed Oct. 5, 2011, the disclosure of which is also incorporated herein by reference in its entirety.

BACKGROUND

1. Field of the Disclosure

The invention relates to the prevention or mitigation of corrosion. The invention particularly relates to the prevention or mitigation of corrosion caused by aldehydes.

2. Background of the Disclosure

H₂S Sulfide ($H_2S$) and/or mercaptans are often encountered in the exploration for and production of oil and natural gas. The presence of $H_2S$ and mercaptans is usually objectionable because they may react with other hydrocarbons or fuel system components. Another reason that the $H_2S$ and mercaptans are objectionable is that they are often highly corrosive. Still another reason that $H_2S$ and mercaptans are undesirable is that they have highly noxious odors. The odors resulting from $H_2S$ and mercaptans are detectable by the human nose at comparatively low concentrations and are well known. For example, mercaptans are used to odorize natural gas and used as a repellant by skunks and other animals.

One solution to these problems is to "scavenge" $H_2S$ and/or mercaptans. Certain aldehydes are known to be useful for these purposes. For example, glyoxal (OHCCHO) has been used at low pH (sometimes as low as pH 2-4) as a successful scavenger. Glyoxal and other aldehydes such as acrolein and formaldehyde are known to be useful in a variety of other applications such as biocides, disinfectants, and the like.

But the use of such aldehydes can of themselves sometimes be a problem. Aldehydes may be corrosive to metals such as aluminum, iron, and steel. It would be desirable to be able to employ such aldehydes at high concentration while minimizing the corrosion caused to metals in contact with the aldehydes.

SUMMARY

In one aspect, the invention is a method for employing an aldehyde in an aqueous solution while mitigating corrosion to metal in contact with the aldehyde solution. The method includes employing a corrosion inhibitor prepared using a member selected from the group consisting of a mono-basic soluble phosphate salt, di-basic soluble phosphate salt, a tri-basic soluble phosphate salt, a phosphate ester, a thiophosphate ester, a thioamine, Mannich Reaction Product, and combinations thereof.

In another aspect, the invention is, in a process for the exploration for or the production of crude oil and/or natural gas, employing an aldehyde as a $H_2S$ sulfide scavenger and employing a corrosion inhibitor prepared using a member selected from the group consisting of a mono-basic soluble phosphate salt, di-basic soluble phosphate salt, a tri-basic soluble phosphate salt, a phosphate ester, a thiophosphate ester, a thioamine, Mannich Reaction Product (MRP), and combinations thereof.

DESCRIPTION

In one embodiment, the disclosure is directed to a method for employing an aldehyde in an aqueous solution while mitigating corrosion to metal in contact with the aldehyde solution, the method including employing a corrosion inhibitor prepared using a formulation including a mono-, di- or tri-basic soluble phosphate salt. In practicing the various embodiments of the method of the disclosure, an aldehyde aqueous solution is employed. The aldehydes which may be employed in the practice of the method of the disclosure include, but are not limited to glyoxal, acrolein, glutaraldehyde, formaldehyde, and combinations thereof. Any aldehyde that may be employed in an aqueous solution and is effective at scavenging H2S may be employed.

The aldehydes may be particularly a problem when in a comparatively concentrated form. For example, in some embodiments, the method of the disclosure is often employed where the aldehydes are present at a concentration of from about 4 to about 95% by weight. When the aldehydes are more dilute or concentrated, they often are not sufficiently corrosive to warrant a corrosion inhibitor; however they may be employed anytime that the aldehydes are present at a concentration such that a significant amount of corrosion may occur. This will vary according to the type of metal the aldehydes are contacting and the level of resilience of the system to which they are applied. For example, in some embodiments, the aldehyde will be present at a concentration of from about 5 to about 80 wt. %. In other embodiments, the concentration may be from about 10 to about 75 wt. %.

In the practice of the application, a mono-, di- or tri-basic soluble phosphate salt is used to mitigate corrosion by the aldehydes as discussed below. While any soluble salt may be used, in many embodiments, the phosphate salts employed will be selected from the group consisting of $LiH_2PO_4$, $NaH_2PO_4$, $Na_2HPO_4$, $Na_3PO_4$, $KH_2PO_4$, $K_2HPO_4$; $K_3PO_4$; and combinations thereof.

In other embodiments, there may be more than a single cation in the salt, for example, $Na_2KPO_4$ or $NaLiKPO_4$, and the like. Stated another way, the mono, di, or tri-basic soluble phosphate salt may include more than one cation. In some embodiments, when the mono-, di- or tri-basic soluble phosphate salt includes two or more cations, they may be selected from the group consisting of lithium, potassium, and sodium.

The phosphate salts may be employed in any concentration effective to prevent or mitigate corrosion caused by the aldehydes. For example, in some embodiments, the mono-, di- or tri-basic phosphate salts may be present at a concentration of from about 10 ppm to 10% (by wt.). In other embodiments, they may be present at a concentration of from about 100 ppm to about 2%. In still other embodiments, they are present at a concentration of from about 1000 ppm to about 1 percent.

In another embodiment, the aldehydes may be admixed with a phosphate ester, a thiophosphate ester, or a thioamine. For the purposes of this application, the term phosphate esters means compounds having the general formula:

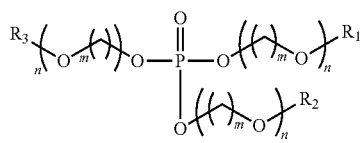

wherein: m is an integer ranging from 2 to 3; n is an integer ranging from about 0 to about 20; and R1, R2, and R3 are H or a C1-C18 alkyl, aryl or alkyl aryl moiety. The sum of all n's is at least 1. Exemplary phosphate esters include but are not limited to: methyl phosphate, dimethyl phosphate, trimethyl phosphate, ethyl phosphate, diethyl phosphate, triethyl phosphate, butyl phosphate, dibutyl phosphate, tributyl phosphate, 2-ethylhexyl phosphate, 2-diethyhexyl phosphate, tri (2-ethylhexyl)phosphate, butoxyethyl phosphate, dibutoxyethyl phosphate tributoxyethyl phosphate, phenyl phosphate, diphenyl phosphate, triphenyl phosphate, cresyl phosphate, dicresyl phosphate, tricresyl phosphate, xylenyl phosphate, dixylenyl phosphate, trixylenyl phosphate, isopropylphenyl phosphate, bis(isopropylphenyl)phosphate, tris (isopropylphenyl)phosphate, (phenylphenyl)phosphate, bis (phenylphenyl)phosphate, tris(phenylphenyl)phosphate, naphthyl phosphate, dinaphthyl phosphate, trinaphthyl phosphate, cresyldiphenyl phosphate, xylenyldiphenyl phosphate, diphenyl(2-ethylhexyl)phosphate, di(isopropylphenyl)phenylphosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, poly(oxy-1,2-ethanediyl), alpha-tridecyl-omega-hydroxy-, phosphate, melamine pyrrophosphate, triphenyl phosphine oxide, tricredyl phosphine oxide, poly(oxy-1,2-ethanediyl), a-hydro-w-hydroxy-, mono-C8-10-alkyl ethers, phosphates, diphenyl methane phosphonate, diethyl phenylphosphonate and the like.

Aromatic condensed phosphate esters may also be used and include, but are not limited to resorcinol polyphenylphosphate, resorcinol poly(di-2,6-xylyl)phosphate, bisphenol A polycredylphosphate, hydroquinone poly(2,6-xylyl)phosphate, and a condensate thereof.

The thiophophate esters useful with the method of the disclosure include, but are not limited to bis(2-ethylhexyl) thiophosphate, diethyl thiophosphate, dimethyl thiophosphate, bis(2-ethylhexyl)dithiophosphate, diethyl dithiophosphate and dimethyl dithiophosphate. Dilauryl dithiophosphate, a lauryl trithiophosphite and a triphenyl thiophosphate may also be used with the methods of the application.

The thioamines may include, but are not limited to: N,N-dithio-bis-dimethylamine, N,N-dithio-bis-diethylamine, N,N-dithio-bis-dipropylamine, N,N-dithio-bis-diisopropylamine, N,N-dithio-bis-dibutylamine, N,N-dithio-bis-diisobutylamine, N,N-dithio-bisdiamylamine, N,N-dithio-bis-dihexylamine, N,N-dithiobis-diheptylamine, and N,N-dithio-bis-dioctylamine. Even higher groups such as nonyl, decyl, undecyl and dodecyl may be present but the molecular weight may become so high that the limits of practical dosage are exceeded. Still further examples are N,N-dithio-bis-dicyclohexylamine, N,N-dithio-bis-ditetrahydrofurylamine, N,N-dithio-bis-ditetrahydrothienylamine, N,N-dithio-bis-di-3-cyanoethylamine, N,N-dithio-bis-di-3-chlorethylamine, N,N-dithio-bis-di-3-phenethylamine, N,N-dithio-bis-dibenzylamine, N,N-dithio-bis-ditetrahydrofurfuryl amine, N'',N'-dithio-bis-ditetrahydrothieeylamine, N,N-dithio-bis-N-methylcyclohexylamine, N,N-dithio-bis-N-ethylcyclohexylamine, N,N-dithio-bis-N-isopropylcyclohexylamine, hexylaminopropionitrile, N,N-dithio-bis-tetrahydrofurylaminopropionitrile, N,N-dithio-bis-piperidine, N,N-dithio-bis-a-pipecoline and N,N-dithio-bis-morpholine. The N,N-monothioamines, as: for example N,N-thio-bis-morpholine, N,N-thio-bis-dimethylamine, N,N-thio-bis-diethylamine, N,N-thio-bis-dipropylamine, and N,N-thio-bis-diisopropylamine.

The Mannich Reaction Products (MRP) useful with the method of the disclosure may be prepared by any means known to those skilled in art to be useful for preparing such products. For example, in one embodiment, the Mannich Reaction Product may be prepared by in situ Mannich reaction of tris(hydroxymethyl)aminomethane with a mixture of the corresponding nitroparaffin and formaldehyde followed by reduction of the nitro group of the product to an amine via hydrogenation in the presence of a hydrogenation catalyst. In another embodiment, the Mannich Reaction Product may be prepared by admixing a phenol, an alkanolamine, and formaldehyde mixed in molar ratios resulting in an initiator which can be alkoxylated to prepare polyols.

In another embodiment of the disclosure, the Mannich Reaction Product may be prepared using an aldehyde is selected from the group consisting of formaldehyde, acetaldehyde, propionaldehyde, butyraldehyde, valeraldehyde, caproaldehyde, heptaldehyde, and stearaldehyde, benzaldehyde, salicylaldehyde, furfural, thiophene aldehyde, and formaldehyde-producing reagents, where the formaldehyde-producing regent is selected from the group consisting of paraformaldehyde and formalin. This would include formaldehyde, but could also include other aldehydes such a propionaldehyde.

In same or even a different embodiment, the phenol component may be selected from phenol and 4,4'-dihydroxydiphenylpropane-2,2; but also alkyl substituted phenols wherein the aromatic ring may have one or more alkyl moieties having from 1 to 20 carbons. One such compound would be nonyl phenol.

Amines useful with the method of the disclosure include primary amines and secondary amines, but these compounds may also further comprise functional groups which are inert in a Mannich reaction, e.g. tertiary amino groups, alkoxy groups and hydroxyl groups. Such primary amines include those selected from the group consisting of monoalkyl amines, hydroxyalkyl amines and dialkylaminoalkyl amines. In some embodiments, each alkyl group in the amines may comprise from 1 to 20 carbon atoms which may be interrupted by non adjacent oxygen atoms. Examples of suitable primary amines are propyl amine, n-butyl amine, aminoethanol, $2-(C_{(1)}-C_{(4)}$-alkoxy)ethyl amine, such as 2-methoxyethyl amine, 2-ethoxyethyl amine, $2-(hydroxy-C_{(1)}-C_{(4)}$-alkoxy) ethyl amine such as 2-(hydroxyalkoxy)ethyl amine, and $2-(di-C_{(1)}-C_{(4)}$-alkylamino)ethyl amine such as 2-dimethylaminoethyl amine, 2-diethylaminoethyl amine and $3-(di-C_{(1)}-C_{(4)}$-alkylamino)propyl amine such as 3-dimethylaminopropyl amine and 3-diethylaminopropyl amine. Examples of suitable secondary amines are $di-C_{(1)}-C_{(10)}$-alkyl amines such as diethyl amine, di-n-propyl amine, diisopropyl amine, dicyclohexyl amine, cyclic amines such as morpholine and piperidine, $di-(hydroxy-C_{(1)}-C_{(4)}$-alkyl)amines such as diethanol amine, etc. In some embodiments, the amine can even be just ammonia.

The phosphate salts or other corrosion inhibitors, aldehyde, and water may be admixed in any way known to be useful to those of ordinary skill in the art of preparing additives. For example these components may be combined in a single container batch and admixed using a static or active mixer. In another embodiment, the aldehyde and water may be first admixed and then a solution of the mono-, di- or tri-basic phosphate salt introduced. In still another embodiment, the three streams may be introduced simultaneously through a static mixes into a vessel.

The alkaline phosphate salts useful with the method of the disclosure may be employed at a pH range of from about 4.0 to about 9.0. In some embodiments, the pH range may vary from about 4.5 to about 8.5 while in other embodiments the pH may be from about 5 to about 9.

While not wishing to be bound by any theory, it is nevertheless believed that the mono-, di- and tri-basic salt employed in the method of disclosure works in two ways to prevent corrosion. In a first way, it is believe that the phosphates contact and build an inorganic insoluble metal phosphate film on the metal surface. For example, in the case of iron or steel, an iron phosphate film forms. In the second way, it is believed that the basic nature of the mono, di, and tri-basic phosphate salts either partially or perhaps fully removes the acidic $H_2S(s)$ from the aldehydes. Interfering with the acid $H_2S$ could affect the ability of the aldehydes to chelate metal thus removing or at least moderating this corrosion mechanism.

In another embodiment, the disclosure includes a process for the exploration for or the production of crude oil and/or natural gas, the process including employing an aldehyde as a $H_2S$ sulfide scavenger and employing a corrosion inhibitor prepared from a formulation including a mono-, di- or tri-basic soluble phosphate salt. The process of the disclosure includes both exploration and production. Exploration includes drilling an oil and gas well, and then completing the well to start production of hydrocarbons. Production includes producing production fluid from the oil and gas well.

In some applications, the drilling fluids, formation brines, or the crude oil and/or natural gas encountered in either exploration or production may include undesirable levels of H2S and/or other mercaptans. Employment of an aldehyde scavenger as well as a corrosion inhibitor may be required in these circumstances.

The aldehyde scavengers maybe employed in the process of the disclosure in any way known to be useful to those of ordinary skill in the art of producing oil and gas. For example, it may be atomized and introduced into a gas stream or directly admixed, liquid phase to liquid phase, with a crude oil stream. In another embodiment, when hydrogen sulfide is present in a gaseous stream, the hydrogen sulfide-containing stream may be passed through a contact tower or bubble tower including the scavenger of the application. Such towers may include other scavengers as well such as those disclosed in U.S. Pat. No. 5,508,012, the disclosure of which is hereby incorporated by reference in its entirety. It may also be employed as in, for example, the U.S. Provisional Patent Application having the Ser. No. 61/467,116, which application is fully incorporated herein by reference.

EXAMPLES

The following examples are provided to illustrate the invention. The examples are not intended to limit the scope of the invention and they should not be so interpreted. Amounts are in weight parts or weight percentages unless otherwise indicated.

Examples 1 & 2 and Comparative Examples A-D

Corrosion tests were performed by holding mild steel corrosion coupons at 60° C. for the times shown in Table 1. Corrosion was determined as mils per year loss of metal. The concentration of each compound tested was 1% except as noted below. The blank (control) and each sample was 40% by weight aqueous glyoxal. Results are shown below in Table 1.

TABLE 1

| Sample ID/Inhibitor | Corrosion Rate (mpy) 2 day test | Corrosion Rate (mpy) 14 day test |
|---|---|---|
| Ex 1: $Na_2HPO_4$ | 15 | 110 |
| Ex. 2: $K_2HPO_4$* | — | 8 |
| A: Blank | 120 | 750 |
| B: Cinnamaldehyde | 80 | — |
| C: NaOH | 100 | — |
| D. Bytyl-2yne-1,4 diol | 40 | — |

*2% concentration

Discussion of the Examples

The Examples clearly show that di-basic phosphate salts are effective at mitigation of corrosion by glyoxal.

Example 3

Corrosion tests were performed by immersing mild steel corrosion coupons at 35° C. into glyoxal-containing solutions in CO2 for 1 hour pre-corrosion (blank) and monitor corrosion rate by linear polarization resistance (LPR). After the corrosion rate is stabilized the corrosion inhibitor was injected and rate continuously monitored for approximately 20 hours. Corrosion was determined as mils per year (mpy). The concentration of corrosion inhibitors varied from 30-550 ppm. The solution consisted of 5% by weight aqueous glyoxal. Results are shown below in the Table 2.

TABLE 2

| Sample ID/Inhibitor | Corrosion Rate (mpy) | Percent Inhibition (%) |
|---|---|---|
| Phosphate ester* | | |
| 30 ppm | 2.5 | 96 |
| 300 ppm | 0.7 | 99 |
| 550 ppm | 0.5 | 99 |
| Blank | 65 | — |

*The Phosphate Ester has the formula: $C_{13}H_{27}-O(CH_2)_2-H_2PO_4$

Example 4

The method of Example 3 is repeated substantially identically except that the temperature is 55° C., the time is 17 hours, the concentration of glyoxal is 20% and the concentration of the additives and the resulting corrosion rates are shown below in Table 3.

TABLE 3

| Sample ID/Inhibitor | Corrosion Rate (mpy) | Percent Inhibition (%) |
|---|---|---|
| Phosphate ester | | |
| (From Ex. 3) 500 ppm MRP | 49.0 | 83.6 |
| 500 ppm | 28.0 | 90.7 |
| 250 ppm of MRP AND 250 ppm of Phosphate ester | 2.0 | 99.3 |
| Blank | 300 | — |

Discussion of the Examples

The Examples clearly show that phosphate ester and thioamine are effective at mitigation of corrosion by glyoxal, especially at lower concentrations. Higher concentrations of glyoxal can be treated with combinations of phosphate esters and Mannich reaction products to reduce corrosion rates.

The invention claimed is:

1. A method for employing an aldehyde selected from the group consisting of glyoxal, acrolein, glutaraldehyde, and combinations thereof, in an aqueous solution while mitigating corrosion of metal in contact with the aldehyde solution, the method comprising employing a corrosion inhibitor with the aldehyde wherein the corrosion inhibitor comprises a member selected from the group consisting of a mono-basic soluble phosphate salt, a di-basic soluble phosphate salt, a tri-basic soluble phosphate salt, a phosphate ester, a thiophosphate ester, a thioamine, a Mannich Reaction Product, and combinations thereof.

2. The method of claim 1 wherein the member selected from the group consisting of a mono-basic soluble phosphate salt, a di-basic soluble phosphate salt, a tri-basic soluble phosphate salt, and combinations thereof is selected from the group consisting of $LiH_2PO_4$, $NaH_2PO_4$, $Na_2HPO_4$, $Na_3PO_4$, $KH_2PO_4$, $K_2HPO_4$, $K_3PO_4$ and combinations thereof.

3. The method of claim 1 wherein the member selected from the group consisting of a mono-basic soluble phosphate salt, a di-basic soluble phosphate salt, a tri-basic soluble phosphate salt, and combinations thereof includes more than one cation.

4. The method of claim 3 wherein the member selected from the group consisting of a mono-basic soluble phosphate salt, di-basic soluble phosphate salt, a tri-basic soluble phosphate salt, and combinations thereof includes two or more cations selected from the group consisting of lithium, potassium, sodium and combinations thereof.

5. The method of claim 1 wherein the aqueous aldehyde solution has an aldehyde concentration of from about 4 to about 90 weight percent.

6. The method of claim 1 wherein the member selected from the group consisting of a mono-basic soluble phosphate salt, a di-basic soluble phosphate salt, a tri-basic soluble phosphate salt, and combinations thereof is present in the aqueous aldehyde solution at a concentration of from about 100 ppm to 30% (by wt.).

7. The method of claim 1 wherein the aldehyde and corrosion inhibitor solution is employed at a pH range of from about 5 to about 9.0.

8. The method of claim 1, wherein the pH range may vary from about 4.5 to about 9.

9. A process for exploring for or producing crude oil and/or natural gas comprising employing a $H_2S$ sulfide scavenger solution comprising an aldehyde and employing a corrosion inhibitor in the solution comprising a member selected from the group consisting of a mono-basic soluble phosphate salt, a di-basic soluble phosphate salt, a tri-basic soluble phosphate salt, a phosphate ester, a thiophosphate ester, a thioamine, Mannich Reaction Product, and combinations thereof, wherein the aldehyde is selected from the group consisting of glyoxal, acrolein, glutaraldehyde, and combinations thereof.

10. The process of claim 9 wherein the member selected from the group consisting of a mono-basic soluble phosphate salt, a di-basic soluble phosphate salt, a tri-basic soluble phosphate salt, and combinations thereof is selected from the group consisting of $LiH_2PO_4$; $NaH_2PO_4$, $Na_2HPO_4$; $Na_3PO_4$; $KH_2PO_4$, $K_2HPO_4$; $K_3PO_4$; and combinations thereof.

11. The process of claim 9 wherein the member selected from the group consisting of a mono-basic soluble phosphate salt, a di-basic soluble phosphate salt, a tri-basic soluble phosphate salt, and combinations thereof includes more than one cation.

12. The process of claim 11 wherein the member selected from the group consisting of a mono-basic soluble phosphate salt, a di-basic soluble phosphate salt, a tri-basic soluble phosphate salt, and combinations thereof includes two or more cations selected from the group consisting of lithium, potassium, sodium, and combinations thereof.

13. The process of claim 9 wherein the $H_2S$ sulfide scavenger solution has an aldehyde concentration of from about 4 to about 90 weight percent.

14. The process of claim 9 wherein the member selected from the group consisting of a mono-basic soluble phosphate salt, a di-basic soluble phosphate salt, a tri-basic soluble phosphate salt, and combinations thereof is present in the $H_2S$ sulfide scavenger solution at a concentration of from about 100 ppm to 30% (by wt.).

15. The process of claim 9 wherein the $H_2S$ sulfide scavenger solution comprising aldehyde and member selected from the group consisting of a mono-basic soluble phosphate salt, a di-basic soluble phosphate salt, a tri-basic soluble phosphate salt, and combinations thereof, has a pH range of from about 4.0 to about 9.0.

16. The process of claim 15, wherein the pH range may vary from about 5 to about 9.

17. The process of claim 9 wherein the $H_2S$ sulfide scavenger and corrosion inhibitor are atomized and injected into a gas stream.

18. The process of claim 9 wherein the $H_2S$ sulfide scavenger and corrosion inhibitor are admixed with crude oil.

19. The process of claim 9 wherein hydrogen sulfide is present in a gaseous stream and the hydrogen sulfide-containing stream is passed through a contact tower or bubble tower including the $H_2S$ sulfide scavenger solution comprising the aldehyde and employing a corrosion inhibitor in the solution comprising a member selected from the group consisting of a mono-basic soluble phosphate salt, a di-basic soluble phosphate salt, a tri-basic soluble phosphate salt, a phosphate ester, a thiophosphate ester, a thioamine and combinations thereof.

* * * * *